US010821873B2

(12) United States Patent
Van Wyk

(10) Patent No.: US 10,821,873 B2
(45) Date of Patent: Nov. 3, 2020

(54) MULTI-TANK TRAILER

(71) Applicant: Loren Van Wyk, Pella, IA (US)

(72) Inventor: Loren Van Wyk, Pella, IA (US)

(73) Assignee: LDJ Manufacturing, Pella, IA (US)

( * ) Notice: Subject to any disclaimer, the term of this patent is extended or adjusted under 35 U.S.C. 154(b) by 185 days.

(21) Appl. No.: 15/923,847

(22) Filed: Mar. 16, 2018

(65) Prior Publication Data
US 2019/0283651 A1   Sep. 19, 2019

(51) Int. Cl.
*B60P 3/22* (2006.01)
*B60R 3/00* (2006.01)
*B62D 63/06* (2006.01)
*B60P 3/24* (2006.01)

(52) U.S. Cl.
CPC .............. *B60P 3/2215* (2013.01); *B60P 3/24* (2013.01); *B60R 3/005* (2013.01); *B62D 63/06* (2013.01)

(58) Field of Classification Search
CPC .... B60P 3/22; B67D 7/78; B67D 7/84; B67D 7/16; B67D 7/40; B67D 7/62; B67F 7/04
USPC .......................................... 141/231; 280/837
See application file for complete search history.

(56) References Cited

U.S. PATENT DOCUMENTS

| | | | | |
|---|---|---|---|---|
| 2,160,477 A | * | 5/1939 | Kramer | B60P 3/221 280/832 |
| 4,819,955 A | * | 4/1989 | Cobb | B60P 3/22 220/1.5 |
| 2017/0267513 A1 | * | 9/2017 | Kittoe | B67D 7/78 |

* cited by examiner

*Primary Examiner* — Tony H Winner
*Assistant Examiner* — Felicia L. Brittman
(74) *Attorney, Agent, or Firm* — Camille L. Urban; BrownWinick Law Firm

(57) ABSTRACT

The present invention comprises a multi-featured trailer designed with transporting hazardous material in mind. The trailer design allows a driver without a hazardous materials transport license or commercial driver's license to legally transport the trailer when it contains hazardous material. It includes a unique hand-rail and bracket system designed to allow the trailer to employ standard sized rails which provides structural support and economic advantage. Further, the inventive trailer features means to accommodate several different tanks together or alone, comprising different capacities and sloped bottoms, in addition to tools and/or machines while employing the same frame, axles and wheels. Employing the inventive design further allows each tank trailer to be "assembled to order" providing a significant manufacturing advantage.

8 Claims, 20 Drawing Sheets

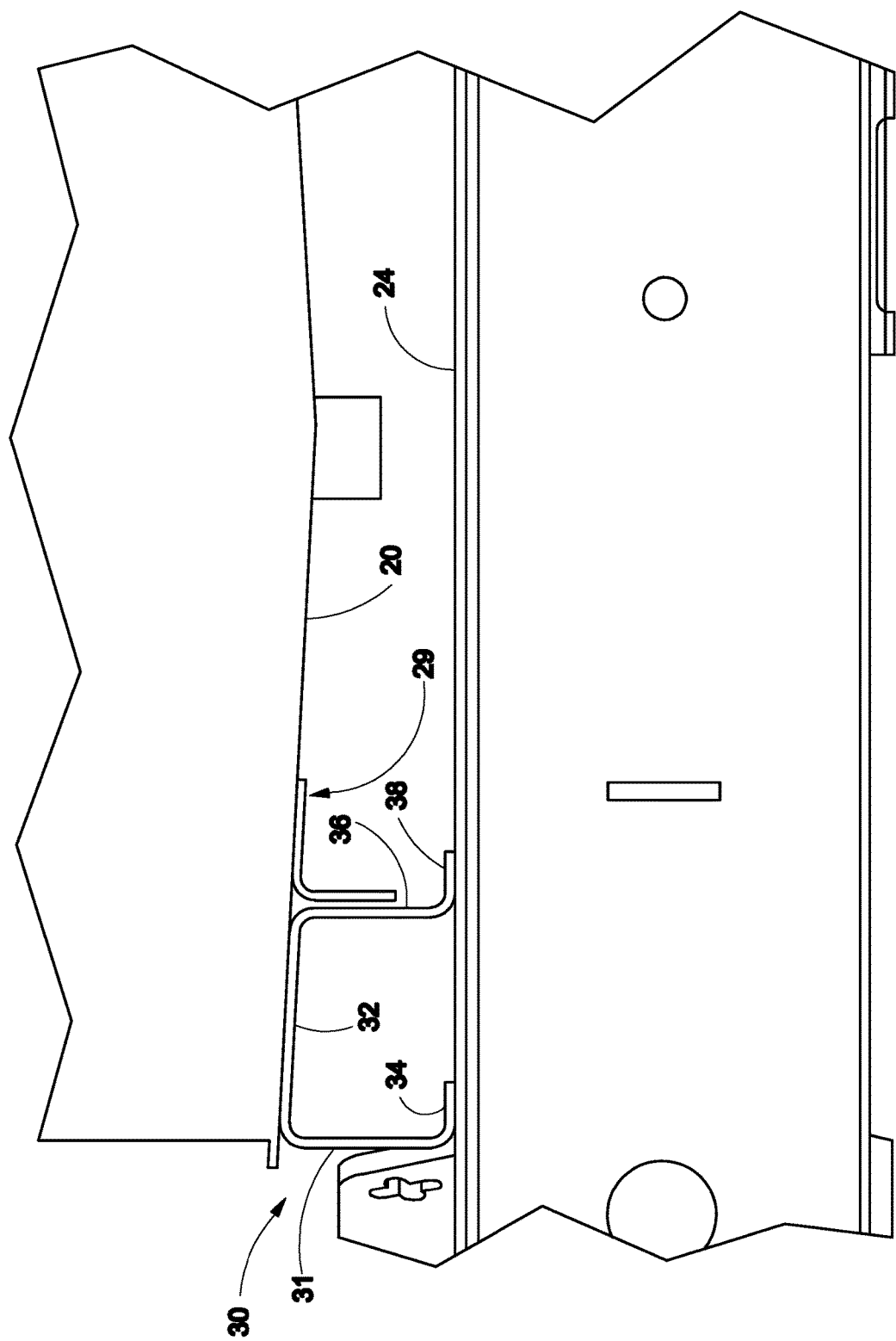

MULTI-TANK TRAILER

BACKGROUND

Current department of transportation requirements dictate that a truck comprising a tank of a given capacity and which is driven on state roads for a commercial purpose must be driven by a driver possessing a commercial driver's license (CDL). If the truck will be transporting hazardous materials and the truck's tank comprises more than a statutorily prescribed volumetric capacity, the driver will also have to be certified to transport hazardous materials. Specifically, a CDL is required to drive any of the following vehicles: Any combination of vehicles with a gross combined weight rating (GCWR) of 26,001 or more pounds, providing the gross vehicle weight rating (GVWR) of the vehicle being towed is in excess of 10,000 pounds. In support of the mission of Federal Motor Carrier Safety Administration (FMCSA) to improve truck and bus safety on the nation's highways, the Federal Hazardous Materials Safety Permit Program for intrastate, interstate, and foreign motor carriers transporting certain types and amounts of hazardous materials was initiated. Carriers transporting hazardous materials must maintain a certain level of safety in their operations and certify they have programs in place as required by the Hazardous Materials Regulations and the HM Permit regulations. Diesel is considered a Hazardous Material under the regulations. When diesel is transported over the road in containers that contain over 119 gallons of diesel the Department of Motor Vehicles requires the driver to possess a Hazardous Materials endorsement and a Commercial Driver's License.

In recent years, the use of Diesel Emissions Fluid has increased in response to new regulation. Diesel Exhaust Fluid (DEF) is a non-hazardous solution, which is 32.5% urea and 67.5% de-ionized water. DEF is sprayed into the exhaust stream of diesel vehicles to break down dangerous NOx emissions into harmless nitrogen and water. DEF is not one of the many fluids considered to be hazardous for transportation purposes, albeit diesel is. The use and delivery requirements for DEF and for diesel often effect agricultural operations as well as other small to medium operations using heavy duty machinery powered by diesel fuel. Often these operations require DEF and diesel to be delivered on-site to the machines that employ it.

Because of the surge in diesel transportation needs (along with transportation needs for nonhazardous fluids such as DEF) more and more drivers are required to possess commercial drivers' licenses and/or hazardous materials certifications. When a load is over 26,000 pounds total gross weight, the driver must possess a CDL. There is, therefore, a nationwide shortage of qualified drivers to transport hazardous fluid in commercial volumes. This shortage is causing pain points in various industries including, but not limited to, construction and agriculture, generally, and to the delivery of compositions and fuels like diesel that are classified as hazardous and are used in those industries.

Transporting smaller volume tanks of diesel or other hazardous fluid does not require transportation by a driver with hazardous material certification or a commercial driver's license. However, if the hazardous material can only be transported in this small volume, the number of trips required to meet the needs of large machinery on job sites and other locations represents a large cost both financially and in time—not to mention it will require many more drivers albeit without the requirements of a commercial drivers' license/hazardous materials endorsement combination.

What was needed was a way to transport larger volumes of liquids such as diesel along with its exhaust management system in the form of DEF without the need for a driver possessing Commercial Driver's License and a hazardous materials certification/endorsement.

SUMMARY

The present invention comprises a multi-tank trailer (MTT) having unique design features that provide additional utility and construction advantages, and economic efficiency. The inventive MTT is equipped with a unique handrail assembly and, also, a rail system associated with the axles and wheels to facilitate modular design. The rail system and the hand rails provide structural support and alignment while taking advantage of the commercially standard rail lengths. The hand rail includes specially designed connectors and a unique mounting method and assembly. The rail system is specially designed to accommodate one or a plurality of tanks. However, the term "tank" may include or be used interchangeably to indicate that tools, tool boxes, machines or other objects may be instead or in additionally associated with the trailer or skid via the unique rail system and/or associated with the hand rail. In this way, the inventive trailer may be tailored to transport not only a plurality of tanks but almost anything that can be secured via the unique rail system. Most preferably, at least some of the objects secured to and by the unique rail system will, in turn, by virtue of the combination of their inherent structure and that of the unique rail system, provide structural support to the skid or trailer.

In most embodiments, the MTT comprises a trailer and a plurality of tanks associated with a skid and loaded on the trailer, or, alternatively, the plurality of tanks is associated directly with the trailer, the trailer or skid sized to accommodate a plurality of tanks. Each of the plurality of tanks may house or contain a volume of fluid that is below that which requires transportation by a driver with a commercial driver's license and/or a hazardous materials certification. Optionally, some of the plurality of tanks may include sloped bottoms for the purpose of more complete, efficient emptying. The sloped bottoms are associated with a skid which may be associated with a platform of the trailer, or associated directly with a platform of the trailer by employing uniquely designed rails and, as needed, connectors. The uniquely designed rails accommodate the sloped bottoms of the tanks by design. In a preferred embodiment, the uniquely designed rails are associated with the aforementioned rail system. In another embodiment, the uniquely designed rails are associated with a rail system on a skid, which skid is, in turn, associated with the platform of the trailer.

The unique rail system is employed with the MTT to allow mounting/securing of tanks of varying capacities/sizes on a single trailer or skid in a manner that facilitates interchanging tanks. Alternatively, the unique rail system may be employed to secure to the skid or trailer tools, or tool boxes, or machines or other objects so long as the object is amenable to being associated with the skid/trailer via the rail system and connectors. The rail system comprises rails spaced in accordance with the tank dimensions, the rails associated and secured to the truck trailer (or to a separate skid which may then be associated with the truck's trailer or another trailer). The rails include means to associate the tanks with the rails, said means may be as simple as nuts and bolts inserted through openings.

The handrails on the MTT comprise commercially available standard lengths which are, preferably, of C-channel construction, however, handrails that comprise a single angle may be employed and may offer cost savings. The handrail lengths are purchased precut, and then cut to desired length as necessary. The handrail lengths are then associated, end to end, by a unique connector assembly. In one embodiment the handrail sections are secured to the trailer with one leg of the "C" channel positioned against a surface of the trailer and the open part of the "C" opened toward the other side of the trailer (or the tanks, tools, tool boxes, or machines that are secured to the trailer or skid via the unique rail system), providing both a secure association and a cosmetically appealing appearance. Or, if using a single angle handrail, one side of the angle is secured to a connector or stand-off, the connector comprising means to allow securement of the connector both to the tank and to the handrail. The connector may include two portions, at a generally right angle relative to one another, one portion affixed to the handrail, another affixed to a tank. In either embodiment, the handrail provides structural support for securing the tanks in position on the trailer platform, truck bed, or skid.

At least some of the handrail lengths are designed to include a wedge-shaped end, so that a top edge of the handrail is shorter than the bottom edge. When two of these handrail lengths are positioned end to end, a generally "V" shaped space is formed. A "V" connector assembly is provided and comprises a face and an anchor plate. The face may be generally triangular in shape to span the generally "V" shaped space. The anchor plate may comprise a length that is wider than the "V" shaped space and further comprise means to associate the anchor plate with both the handrail and the face. In one embodiment the anchor plate is secured in position by aligning holes or openings in the anchor plate and holes in the handrail sections forming the "V" shaped space and securing the anchor plate to each of the handrail sections using nuts and bolts or other mechanical means. Alternatively, weldments or other mechanical associations may be employed in which case the openings may not be necessary. Other anchor plate and face combinations may be employed to secure handrails sections to one another.

In other embodiments the face of the connector assembly is formed to echo the handrail section's general construction relative to height and may include a bottom lip or a top edge complementary to or reflective of a bottom lip or a top edge on the rail section to provide a "puzzle fit" to preserve strength of the rail. The face may even be formed from the same material and of the same general dimensions as the rail, however, complete complementarity in dimension and shape are not required to meet the function and stability requirements for the face and the rail. The face, too, may include an opening or openings which may be aligned with an additional opening or openings in the anchor plate to provide yet another securement point and additional stability.

The multi-tank trailer may, optionally, include a utility box. The utility box may be associated and secured to the multi-tank trailer using either a straight bracket or an angled bracket to connect with a handrail bracket. The handrail bracket also secures the handrail to the tanks on the multi-tank trailer, thereby providing additional structural support.

Finally, these inventive components of the MTT are designed to facilitate a modular design so that the trailer can be "assembled to order" to include the features and capacities desired by the purchaser without the headache and inefficiencies that would be expected for a custom building approach.

BRIEF DESCRIPTION OF THE DRAWINGS

FIG. 20 is an end view of the rail system and a connector.

DETAILED DESCRIPTION

Figure 1:
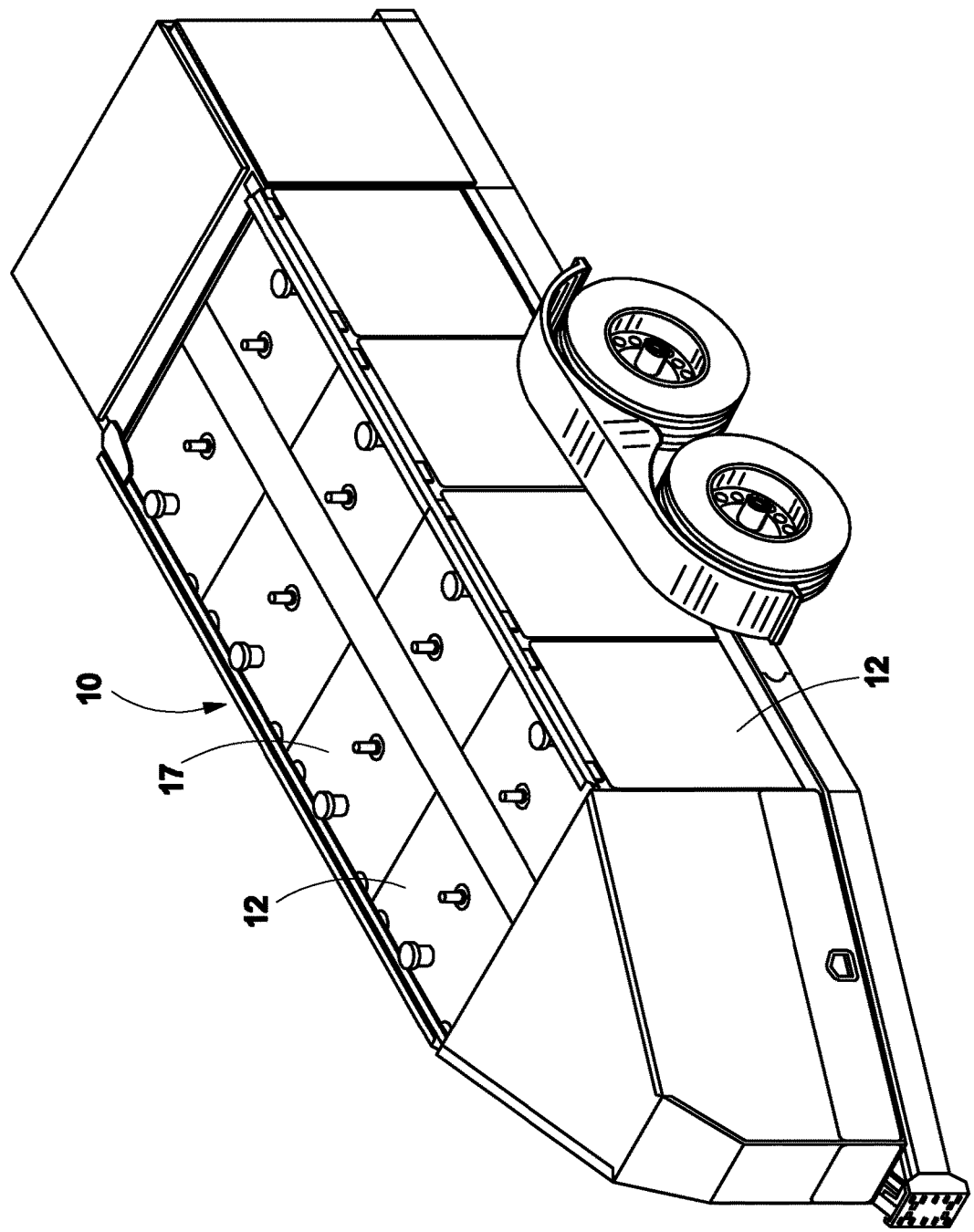
FIG. 1 comprises a view of a multi-tank trailer embodying the present invention.
Figure 2:
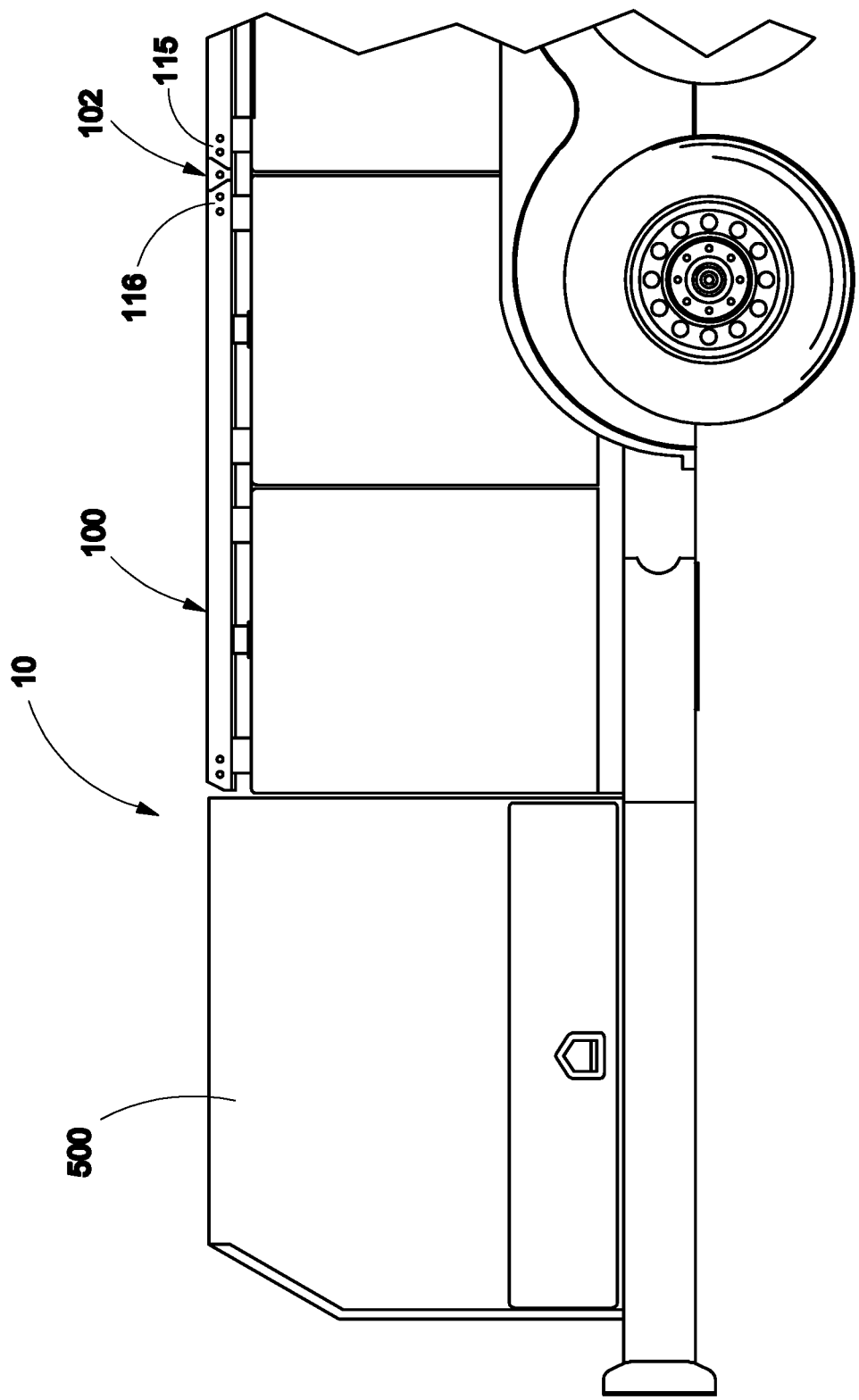
FIG. 2 comprises a partial side view of a multi-tank trailer embodying the present invention.
Figure 3:
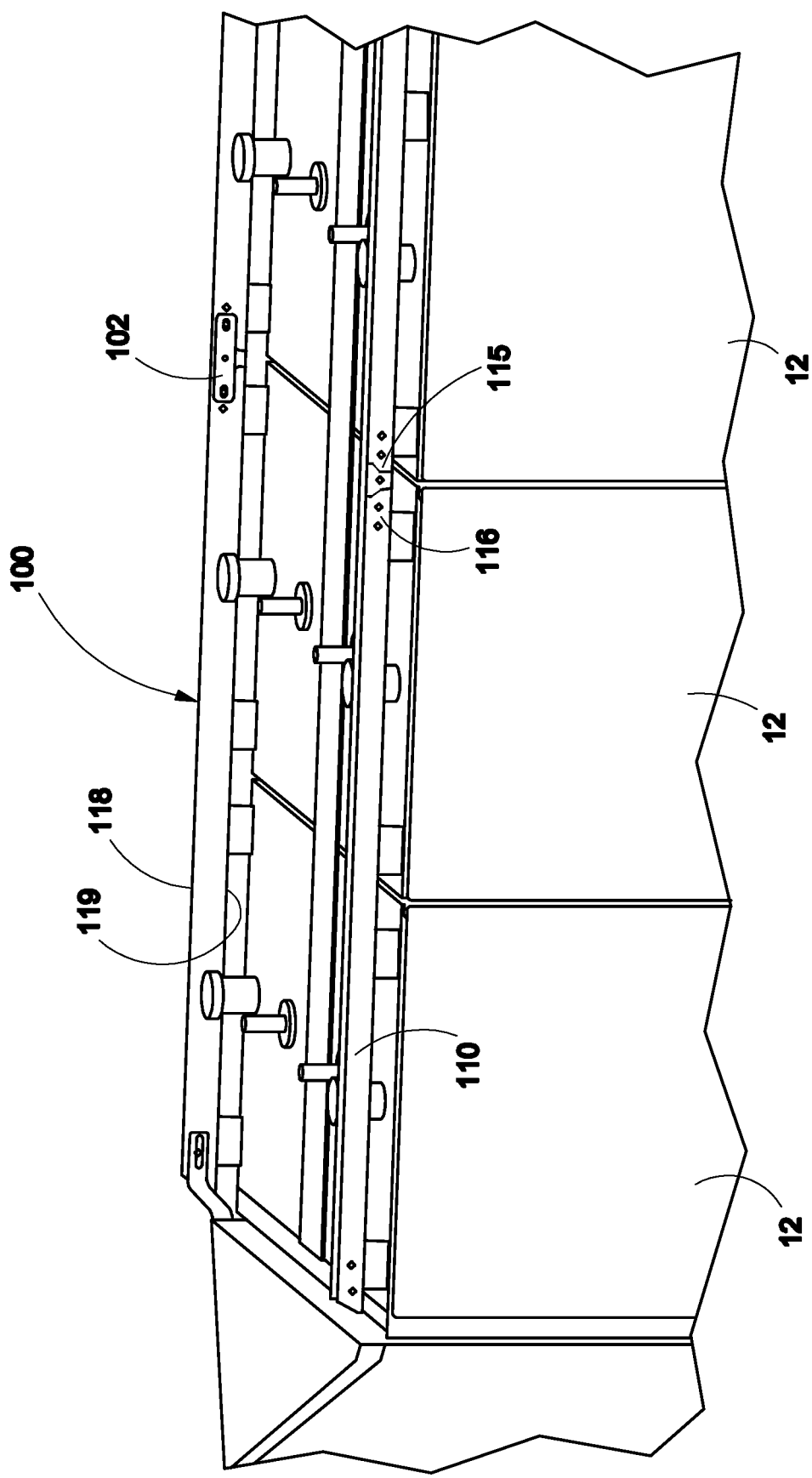
FIG. 3 is a perspective of the upper portion of the multi-tank trailer showing the handrail and connections between sections of the handrail.
Figure 4:
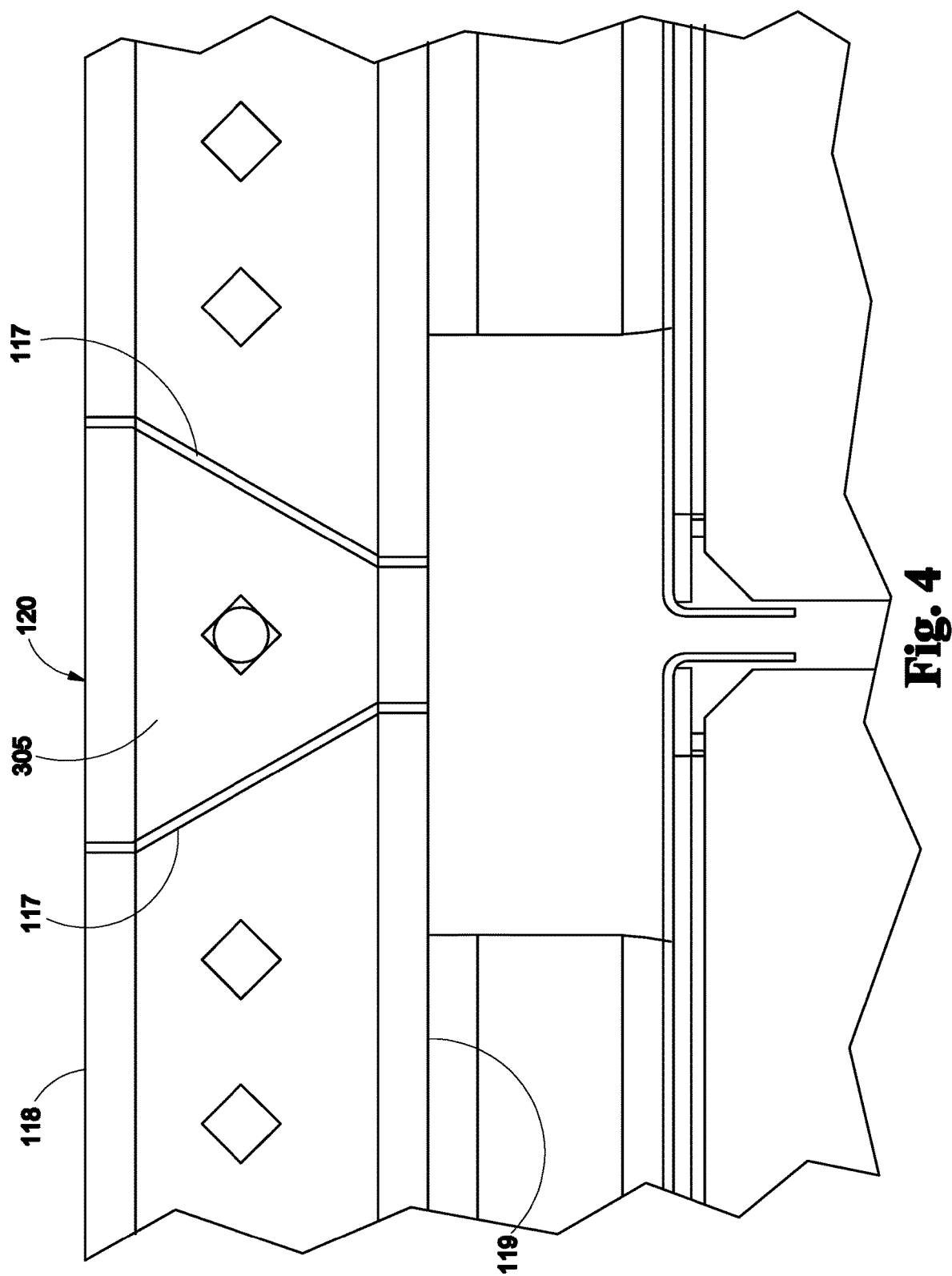
FIG. 4 is an enlarged view of a connector between handrail sections comprising a face plate positioned in a "V"
Figure 5:
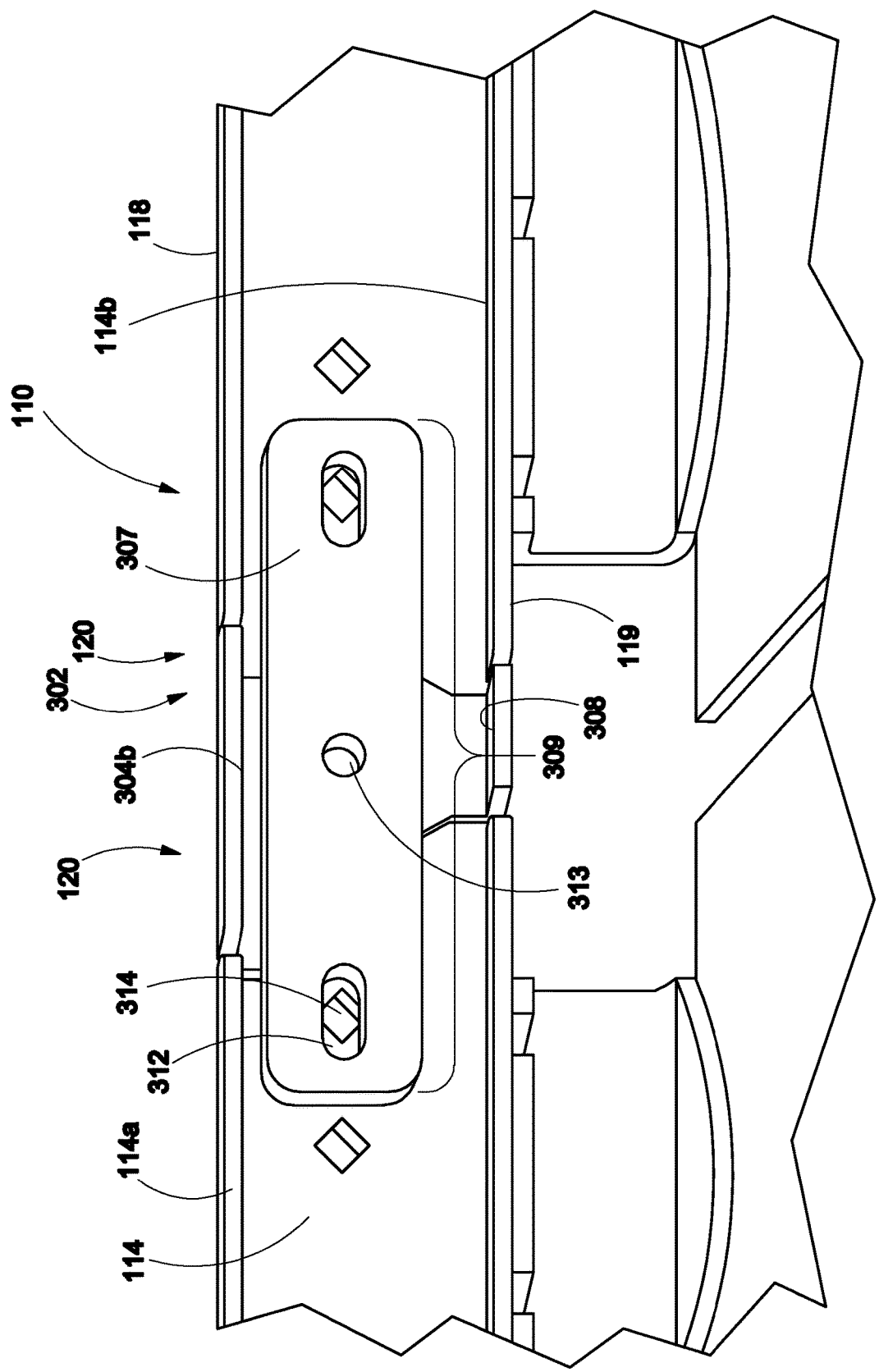
FIG. 5 is an enlarged view of an anchor plate positioned to secure the face plate in the "V", employing a channel "C" handrail.

The present invention comprises a multi-tank trailer (MTT) 10 having unique design features that provide additional utility and construction advantages, and economic efficiency. The inventive MTT 10 is equipped with a unique modular handrail assembly 100 which facilitates assembly of handrails in various lengths to provide the inventive modular handrail assembly 100. The modular hand rail assembly 100 includes specially designed connector assembly 102 and a unique mounting method. A rail system 200 associated (directly or indirectly through a trailer, truckbed or skid) with at least one axle 202 and one or more of a plurality of wheels 204 of the trailer 10 is also provided. The rail system 200 facilitates a trailer 10 having a multi-tank, modular design. The rail system 200 is specially designed to accommodate one or a plurality of tanks 12 (the term "tank" is used here for the purpose of example, and not of limitation. Generally, any object or group of mixed objects that are amenable to association by the rail system and hand rail assembly may comprise the trailer 10). The rail system 200 and the modular hand rail assembly 100, together, provide structural support and alignment and securement for the tanks 12 on the trailer 10 while taking advantage of commercially standard rails 110 at standard lengths 112. Alternatively, the specialized rail system 200 may be associated with a skid which may, in turn, be associated with the trailer 10 as is known in the art.

In most embodiments, the MTT 10 comprises the plurality of tanks 12 associated with a skid 14 which may be attached to a platform 24 of the trailer, or, alternatively, the tanks 12 and associated handrail assembly 100 may be directly attached to the platform 24 to accommodate the plurality of tanks 12.

A CDL is required to drive any of the following vehicles: Any combination of vehicles with a gross combined weight rating (GCWR) of 26,001 or more pounds, providing the gross vehicle weight rating (GVWR) of the vehicle being towed is in excess of 10,000 pounds. In support of the mission of Federal Motor Carrier Safety Administration (FMCSA) to improve truck and bus safety on the nation's highways, the Federal Hazardous Materials Safety Permit Program for intrastate, interstate, and foreign motor carriers transporting certain types and amounts of hazardous materials was initiated. Carriers transporting hazardous materials must maintain a certain level of safety in their operations and certify they have programs in place as required by the Hazardous Materials Regulations and the HM Permit regulations.

Each of the plurality of tanks 12 comprises a volumetric capacity 16 for fluid 18 which is below that for which the department of transportation currently requires a commercial driver's license and/or a hazardous materials certification in order to transport over the highway system. The inventive trailer's design, therefore, provides a trailer 10 for carrying a hazardous liquid that can be transported by a driver without a hazardous materials endorsement or a commercial driver's license.

At least some of the plurality of tanks 12 in the present invention may include a sloped bottom surface 20 for the purpose of more complete, efficient emptying. The sloped bottom surface 20 of a tank 12 is associated with a skid 14 which may be associated with a platform 24 of the trailer 10 (1000), or may be associated directly with a platform 24 of the trailer 10. The sloped surface (bottom) 20 of the tank 12 may be associated with the skid 14 or the trailer 10 using a specially designed connector 29 and a specially designed rail 30 which, in some embodiments, supports the tank 12 in spaced apart relationship from the skid 14 or the trailer 10. The uniquely designed connectors 29 and rails 30 are configured to accommodate the sloped bottom surface 20 of a tank 12. In another embodiment, the uniquely designed connectors 29 and rails 30 are associated with a skid 14, which skid 14 is, in turn, associated with the platform 24 of the trailer 10. In still another embodiment, a frame, 201, an axle 202 and a plurality of wheels 204 on the trailer 10 are standard. Associated with or integral to the frame 201 is a rail system 200 having moveable crossmembers 206. The rails 30 (combined with connectors 29) may also or alternatively provide means to associate the slope bottom 20 of the tank 12 with a crossmember 206.

Figure 19:
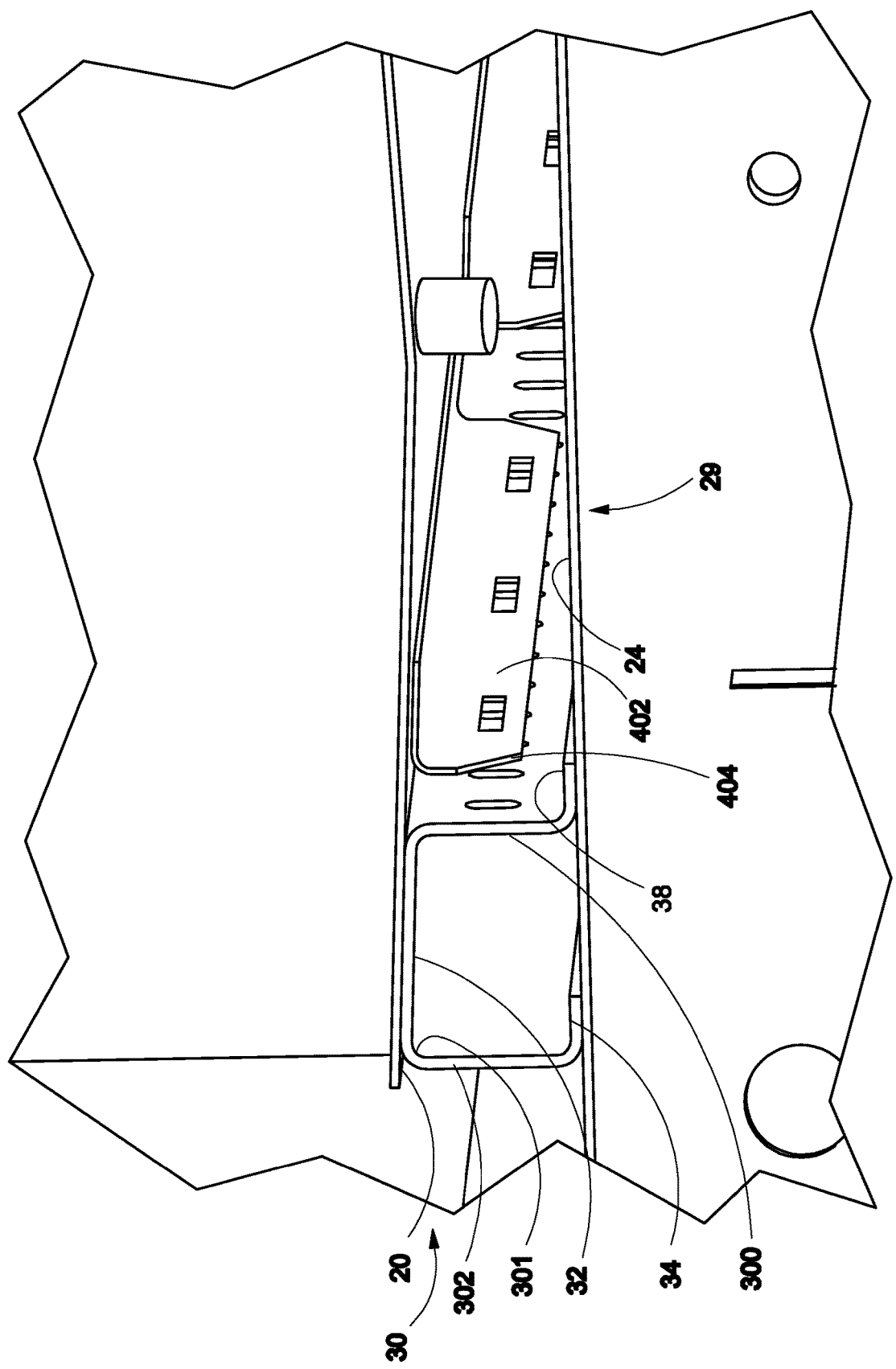
FIG. 19 is a close up, perspective of the rail system.

The rails 30, best shown at FIGS. 19 and 20, comprise a sloping angular attachment portion 300, a first leg 302 extending from the sloping angular attachment portion 300 at a direction and at an angle 301 from the attachment portion 300 and comprising a foot 304; and a second leg 306 extending from the sloping angular attachment portion 300 at the generally same direction as the first leg 302 and generally parallel with the first leg 302 and comprising a second foot 308, wherein one of the legs 302 or 306 is longer than the other thereby creating and supporting the sloping angular attachment portion 300 when the feet 304 and 308 of the rail 30 are associated with a flat surface of the trailer 10, or with the truck bed, or with the skid. The connector 29 is also provided; the connector 29 preferably comprises two portions 402, 404 angled relative to one another wherein a first portion 402 is associated with the sloped bottom 20 of the tank 12, and the second portion 404 is associated with the rail 30. The angular relationship of the two portions, 402 and 404, is dictated by the degree of slope in the sloped bottom 20 of the tank 12. This association fosters the advantage of the sloped bottom 20 for facilitating the emptying of the tank 12 with which the rail 30 is associated while securing the tank 12 to the rail 30 which is, in turn, secured to the rail system 200 or the truck bed or the skid. The sloping angular attachment portion 300 of the rail 30 comprises a slope designed to accommodate the sloped bottom 20 of the tank 12 with which it is associated and the feet 304 and 308 accommodate and are associated with the trailer 10 or with the skid 14 or a truck bed. Association may be via nuts and bolts or other securements well known in the art. If tanks 12 do not include sloped bottom 20, then the rails 30 do not need the sloping angular attachment portion 300 which may, instead, be related to legs 302 and 306 (which may be of equivalent length) by right angles.

Figure 8:
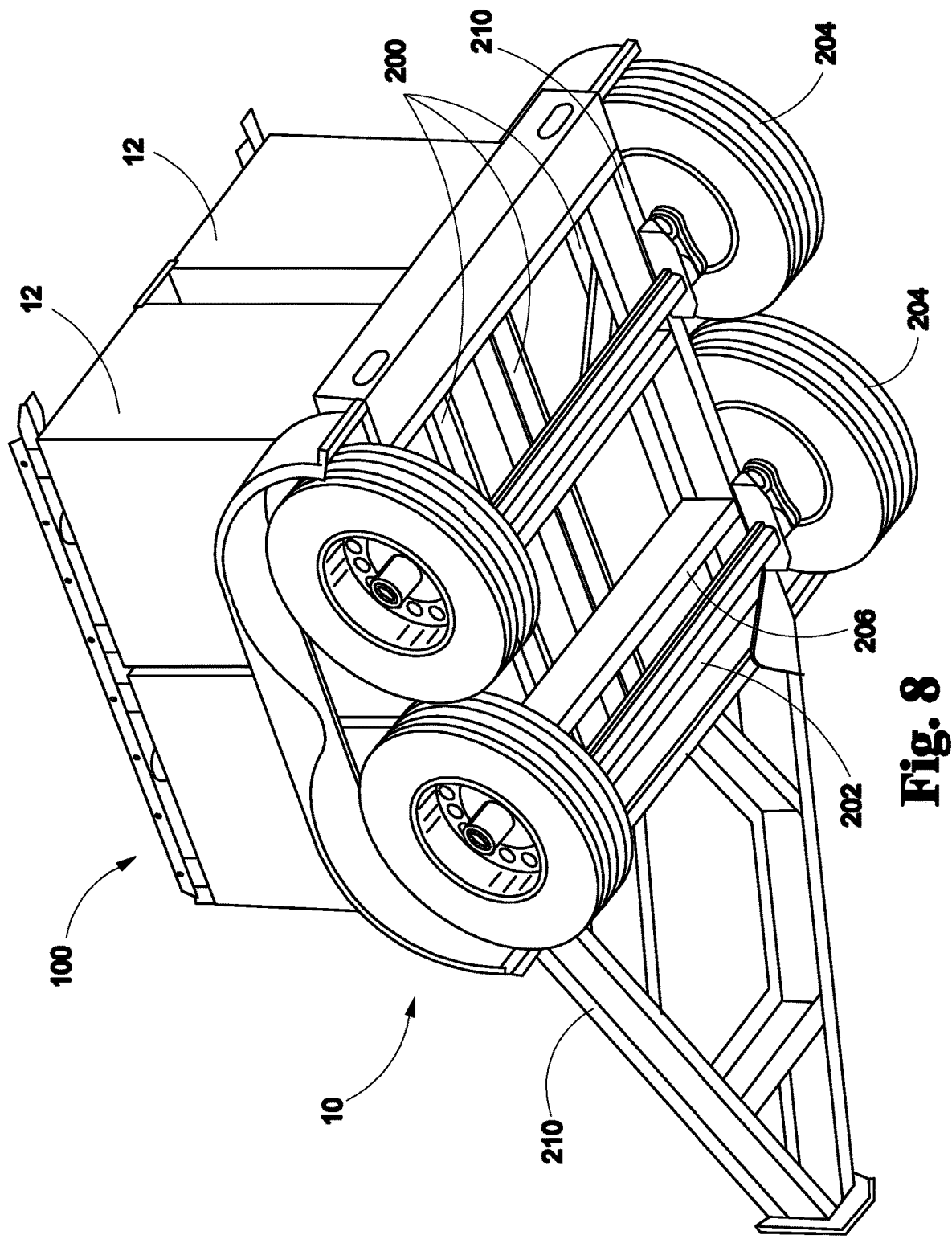
FIG. 8 is a perspective of a multi-tank rail system of the present invention viewed from the bottom.
Figure 9:
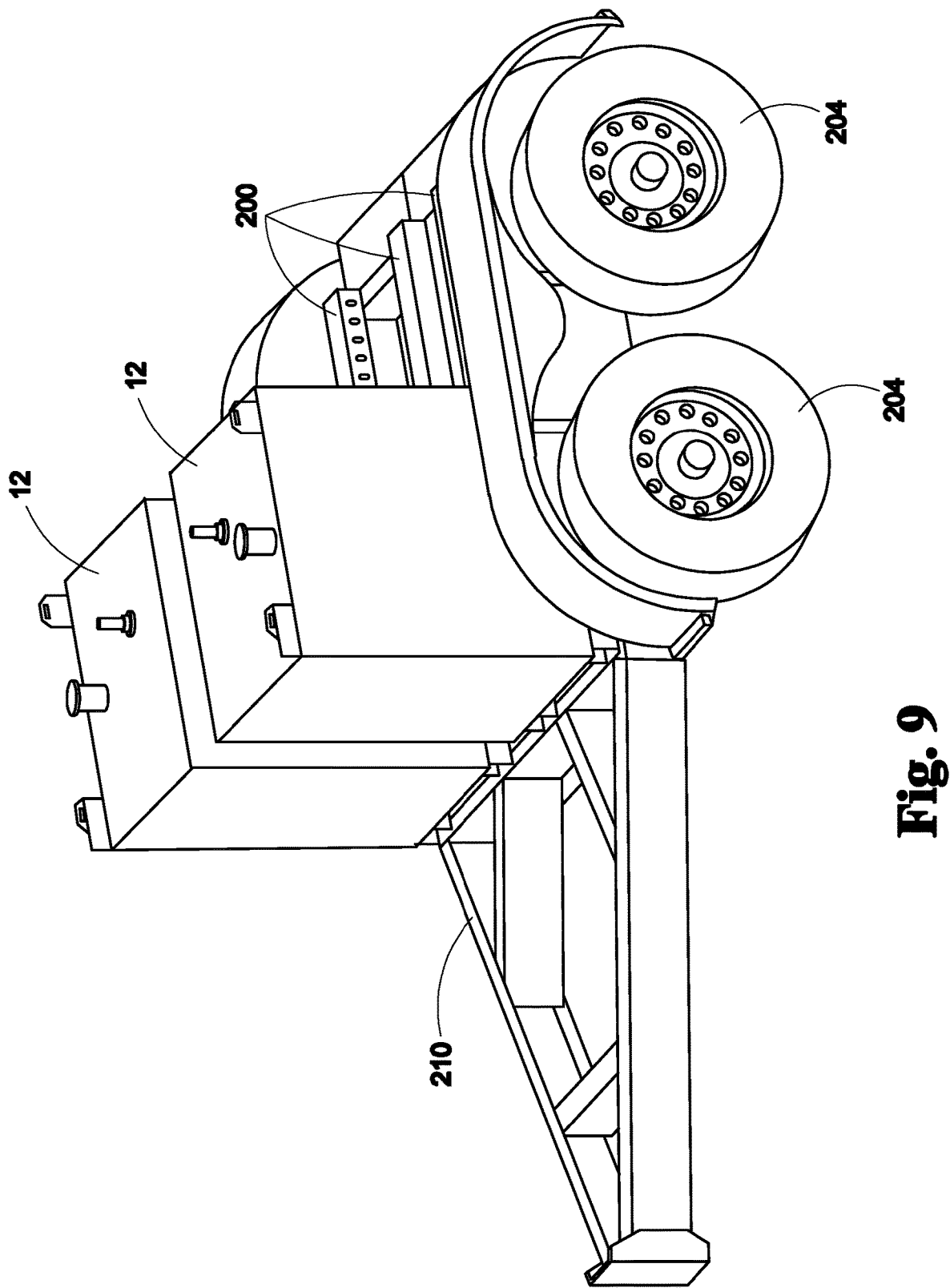
FIG. 9 is a perspective view of the side of a multi-tank trailer of the present invention.
Figure 10:
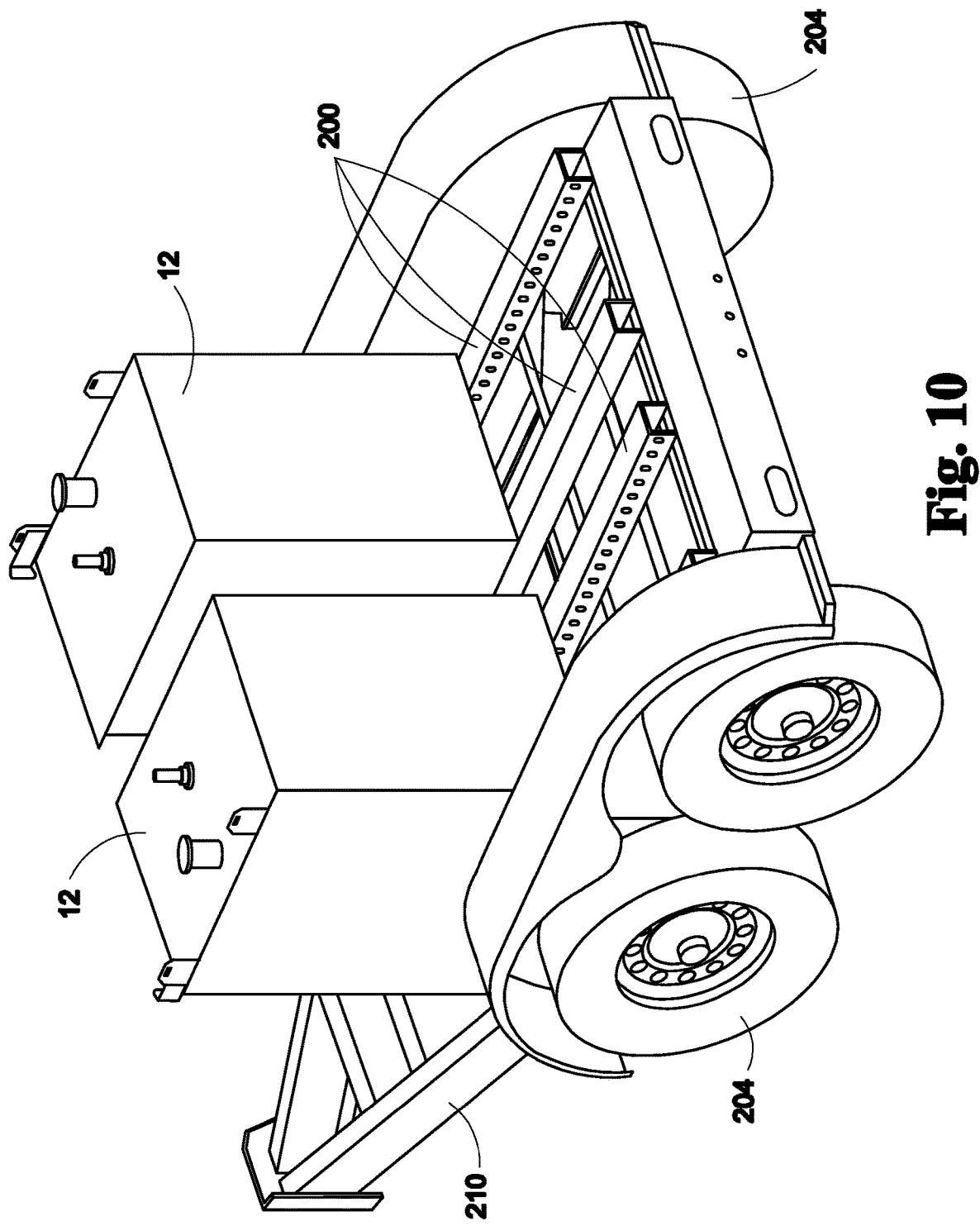
FIG. 10 is a perspective view of the back of a multi-tank trailer of the present invention.
Figure 11:
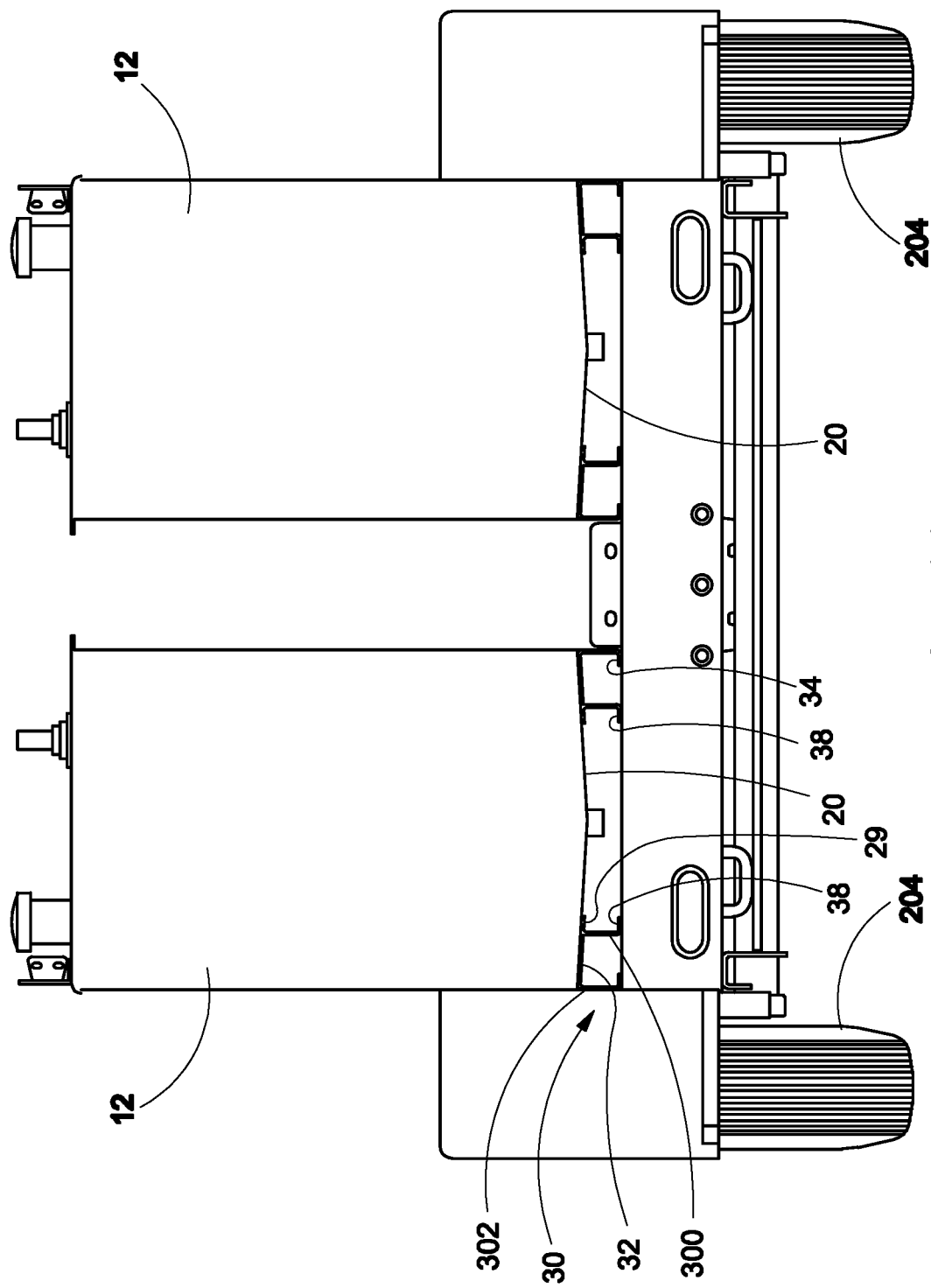
FIG. 11 is a view from behind the trailer showing two slope-bottomed tanks and specialized rails associating the tanks with the trailer deck.
Figure 12:
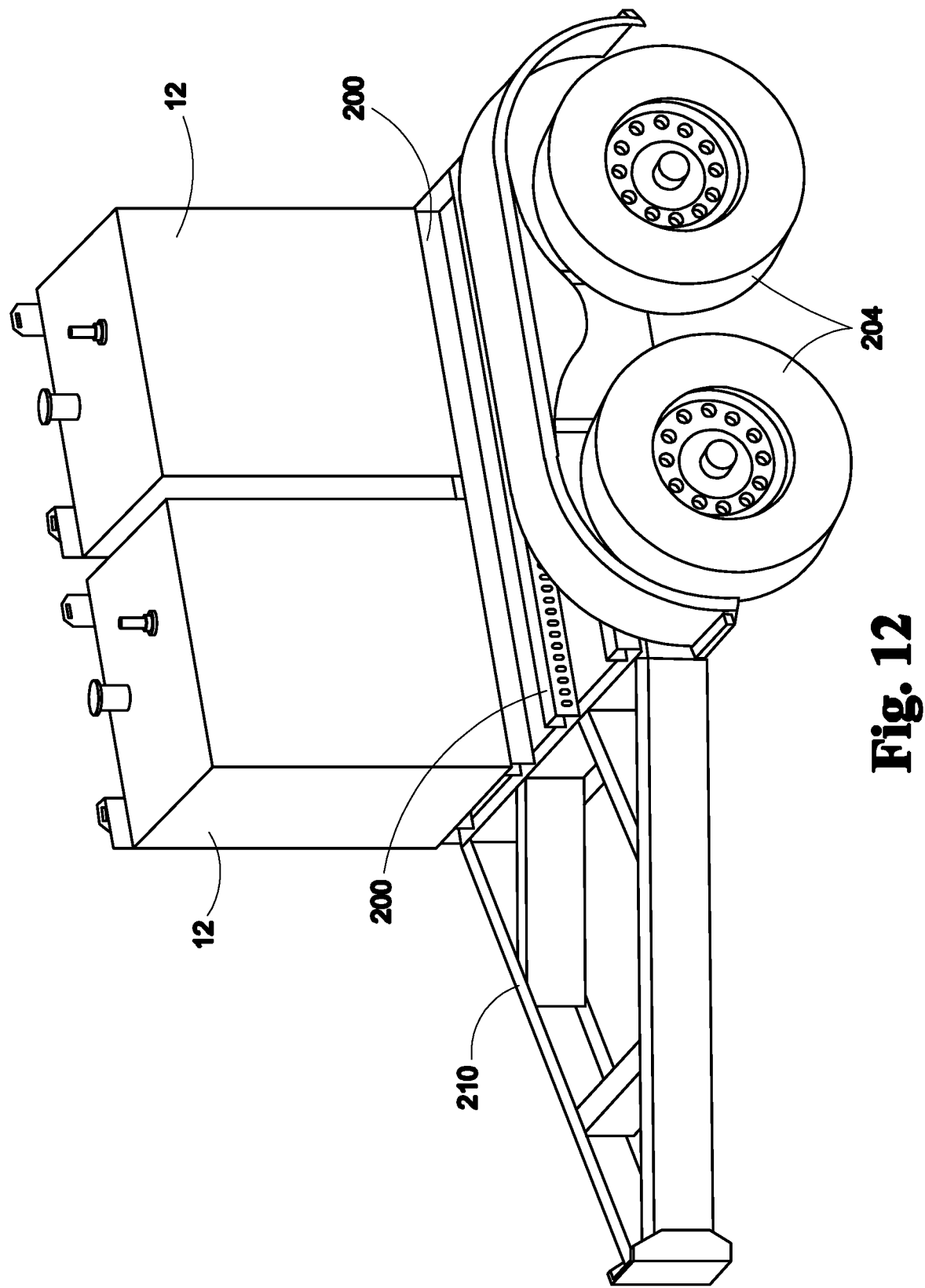
FIG. 12 is a perspective view of a partially loaded multi-tank trailer.
Figure 13:
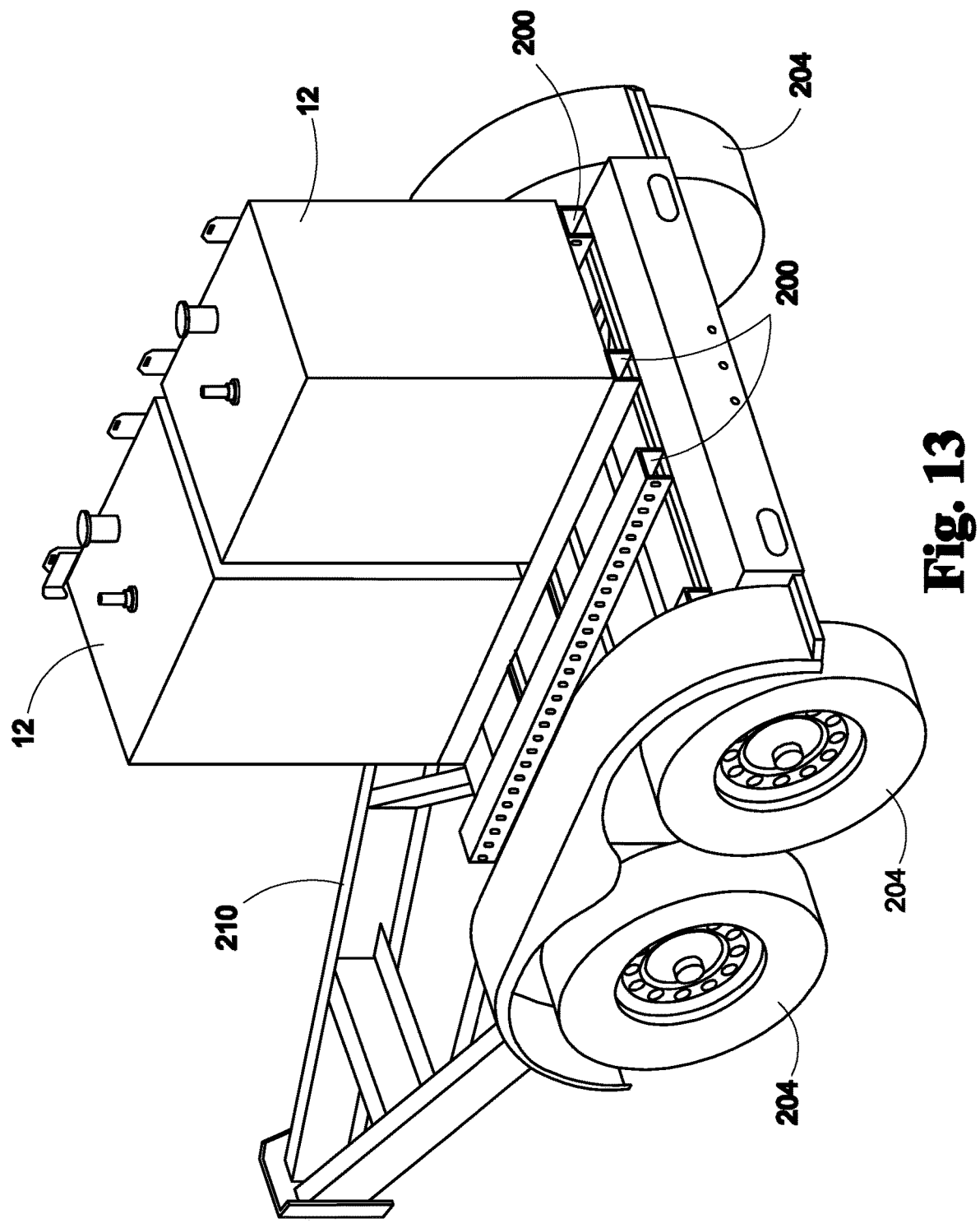
FIG. 13 is another view of the partially loaded multi-tank trailer of FIG. 11.
Figure 14:
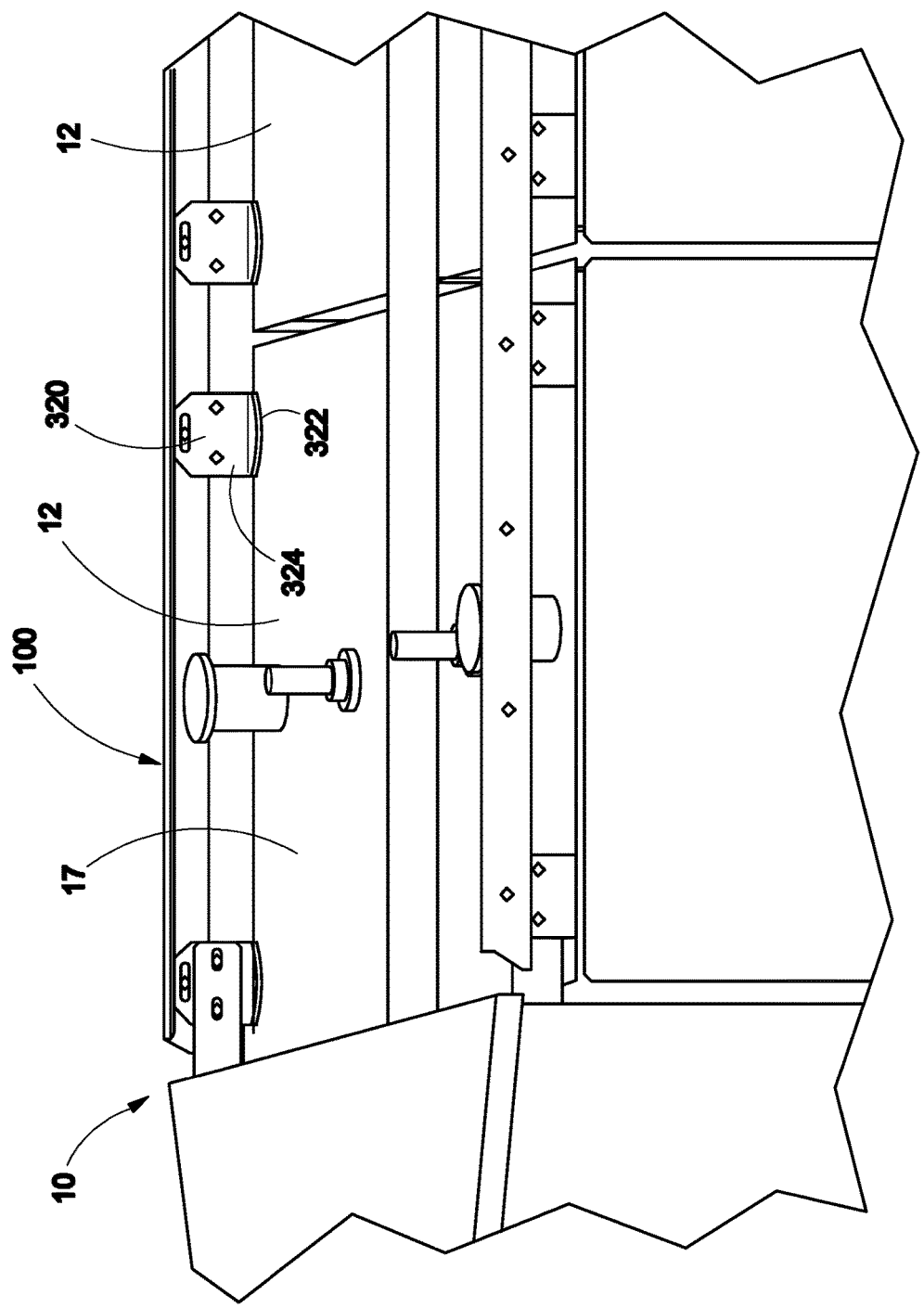
FIG. 14 is a side view of brackets associating a handrail with a tank.

The unique rail system 200 is employed with the MTT 10 to allow mounting/securing of tanks 12 of varying capacities/sizes on a single trailer 10 (1000) in a manner that facilitates interchanging, removal, and replacement of tanks 12. The rail system 200 may include a plurality of crossmembers 206 spaced to allow association of tanks 12 with the rail system 200 using the rails 30. For example, the cross members 206 may be fixed to the trailer 10 such that any size tank 12 can be secured by one or more rails 30 to one or more crossmembers 206 and/or to the rail system 200. Further, a plurality of tanks 12 of a first size and a plurality of tanks 12 of a second size may each be simultaneously associated with one or more crossmembers 206 (see FIG. 8) and/or the rails 30 of the rail system 200. In one embodiment, the crossmembers 206 are moveable to allow for different configurations. In another embodiment, the crossmembers 206 are evenly spaced and connectors 29 are positioned on the tanks 12 to accommodate the even spacing of the crossmembers 206 and rails 30 thereby allowing an arrangement of various sized tanks 12 in accordance with the user's desire. Means to associate 29 the rails 30 may include openings 29 in the rail system 200 and/or in the crossmembers 206, and a way to secure the rails 30 and crossmembers 200, 206 together which may include nuts and bolts, pins, or any of a number of different methods known in the art for securing.

Figure 6:
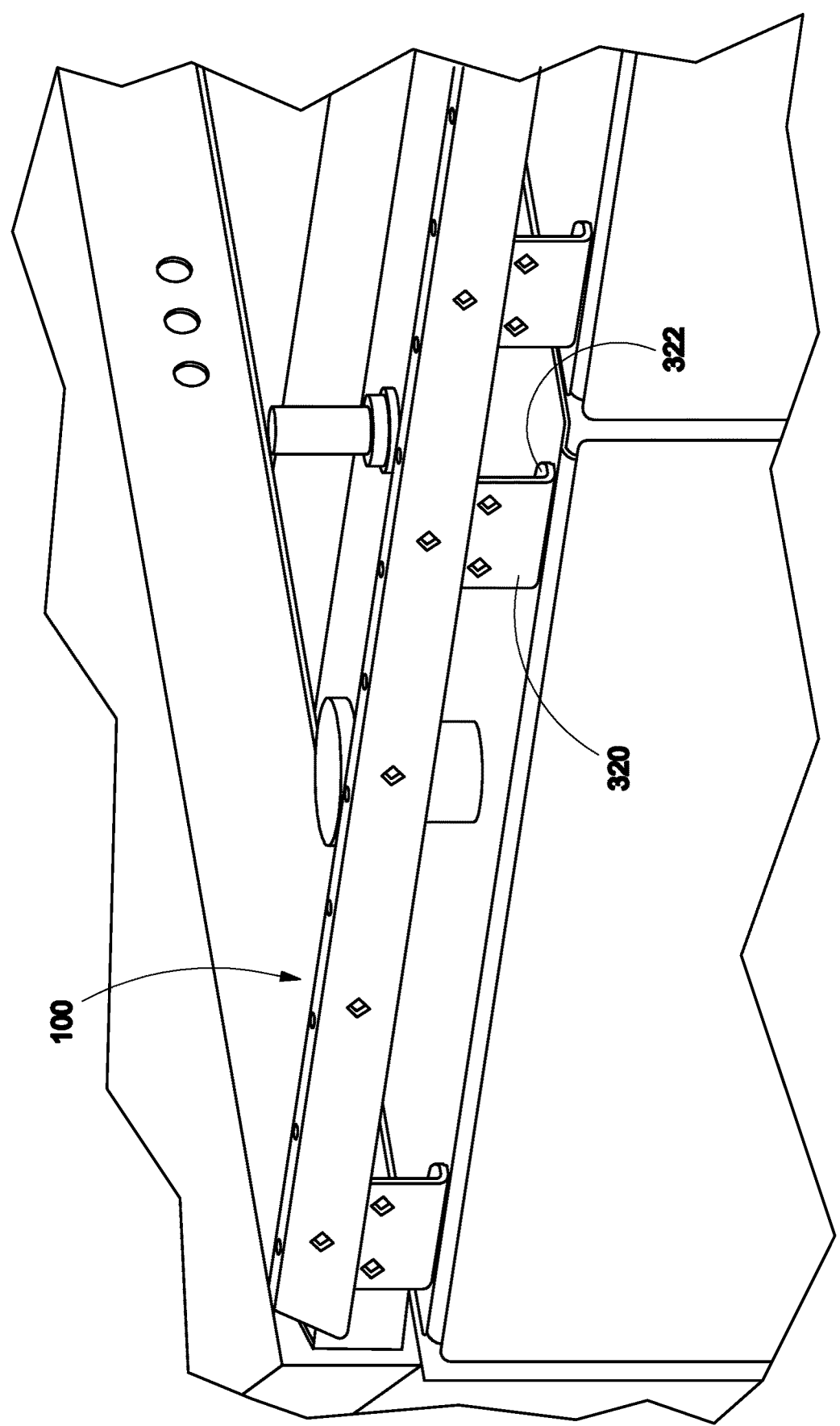
FIG. 6 is an enlarged view of a handrail comprising an angle rail.
Figure 7:
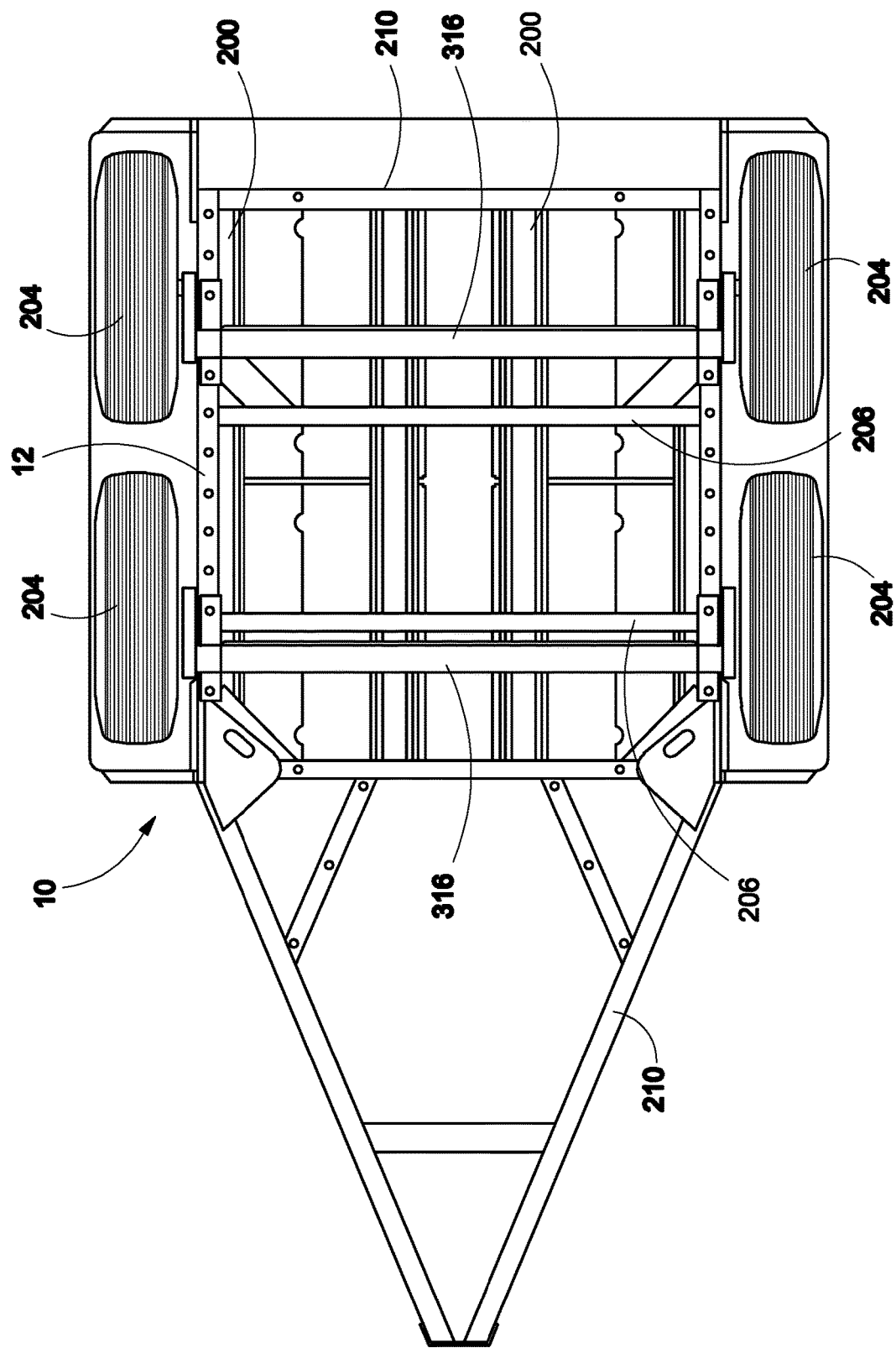
FIG. 7 is a bottom view of a multi-tank trailer of the present invention.

The handrail assembly 100 comprises a plurality of commercially available standard handrails or handrail sections 110 each comprising a first rail end 115 and a second rail end 116, and that are available in standard lengths 112 or may be manufactured or cut to desired lengths. The handrail sections 110 may comprise a C-channel 114 or C-channel construction 114 with one side 105 of the rail 110 open as is well known in the art. At least some of the rails 110 are associated one with another, a first end 115 of a first handrail section 110 associated to a second end 116 of a second handrail section 110, by a unique connector assembly 102. In one embodiment, the connector assembly 102 comprises each of the rails 110 of the handrail assembly 100 which are secured with one side or "leg" 114a of the "C" channel 105 positioned against a surface 17 of the trailer (or skid or truckbed) 10 or mechanically associated with the trailer 10 in a way that facilitates use of the handrail 100, providing both a secure association between the handrail assembly 100 and the trailer 10 and a cosmetically appealing appearance on the outside of the trailer 10. At least one of the ends 115, 116 of at least some of the handrail sections 110 are designed to include a wedge-shaped end 117, with a top edge 118 of the handrail 110 shorter than the bottom edge 119 of the handrail 110 such that when two of these handrail sections 110 are positioned end 115, 116 to end 115, 116, a generally "V" shaped space 120 is formed. The top edge 118 may include a lip and the bottom edge 119 may include a lip. The connector assembly 102 is employed to associate the end 115 of a first rail section 110 to the end 116 of a second rail section 110 and comprises a face plate 305 and an anchor plate 307. The face plate 305 may be generally triangular in shape to span the generally "V" shaped space 120 but it should be understood that the shape of the face plate 305 is not critical so long as it is able to provide the strength and stability necessary to secure the first end 115 and the second end 116. The anchor plate 307 may comprise a length 309 that is wider than the "V" shaped space 120 and further comprises means to associate 310 the anchor plate 307 with both the handrail 110 and the face plate 305. In one embodiment the anchor plate 307 is secured in position by aligning holes or openings 312 in the anchor plate and holes 314 in the handrail sections forming the "V" shaped space 120 and securing in place using nuts and bolts or other securement means 316. The space 120 may be square or rectangular or even rounded, however, for strength benefits and ease of construction a "V" shape works well. Alternatively, weldments or other mechanical associations may be employed in which case the openings 312 and/or 314 may not be necessary. The handrail assembly 100 may additionally be secured to the trailer via feet 320, (or stand-offs 320) constructed to provide a space between the handrail 110 and the trailer 10. The feet/stand-offs 320 may simply comprise a foot portion 322 and a body portion 324 angled from the foot portion 322 (See FIG. 6). In one embodiment, each of the stand offs 320 are affixed to or associated with one of the plurality of tanks 12, specifically, the foot 322 of a standoff 320 is associated with the tank 12, and the body portion 324 is associated with the handrail assembly 110. Alternatively, the foot 322 may be associated with the handrail assembly 100 and the body 324 associated with the tank 12. Association of the feet may be by screws, nails, glue, snap-fit or other means known in the art. Further, said feet/stand-offs 320 may not be secured to the trailer but only to the tank 12. Once again, this construction is specially designed to allow interchangeable handrail lengths, and provide simplicity in securing the lengths to the trailer 10 and to each other to form the handrail assembly 100.

In embodiments the face plate 304 of the connector assembly 102 is formed to echo the handrail section's general construction relative to height and may include a bottom lip 304a or a top edge 304b complementary to or reflective of a bottom edge 119 or a top edge 118 on the rail sections 110 to provide a "puzzle fit" to preserve strength of the rail. The face 304 may even be formed from the same material and of the same general dimensions as the rail, however, complete complementarity in dimension and shape are not required to meet the function and stability requirements for the face plate 304 and the rail 110. The face 304, too, may include an opening or openings 313 which may be aligned with an additional opening or openings in the anchor plate 312 and the opening 314 in the rail to provide yet another securement point and additional stability.

Figure 15:
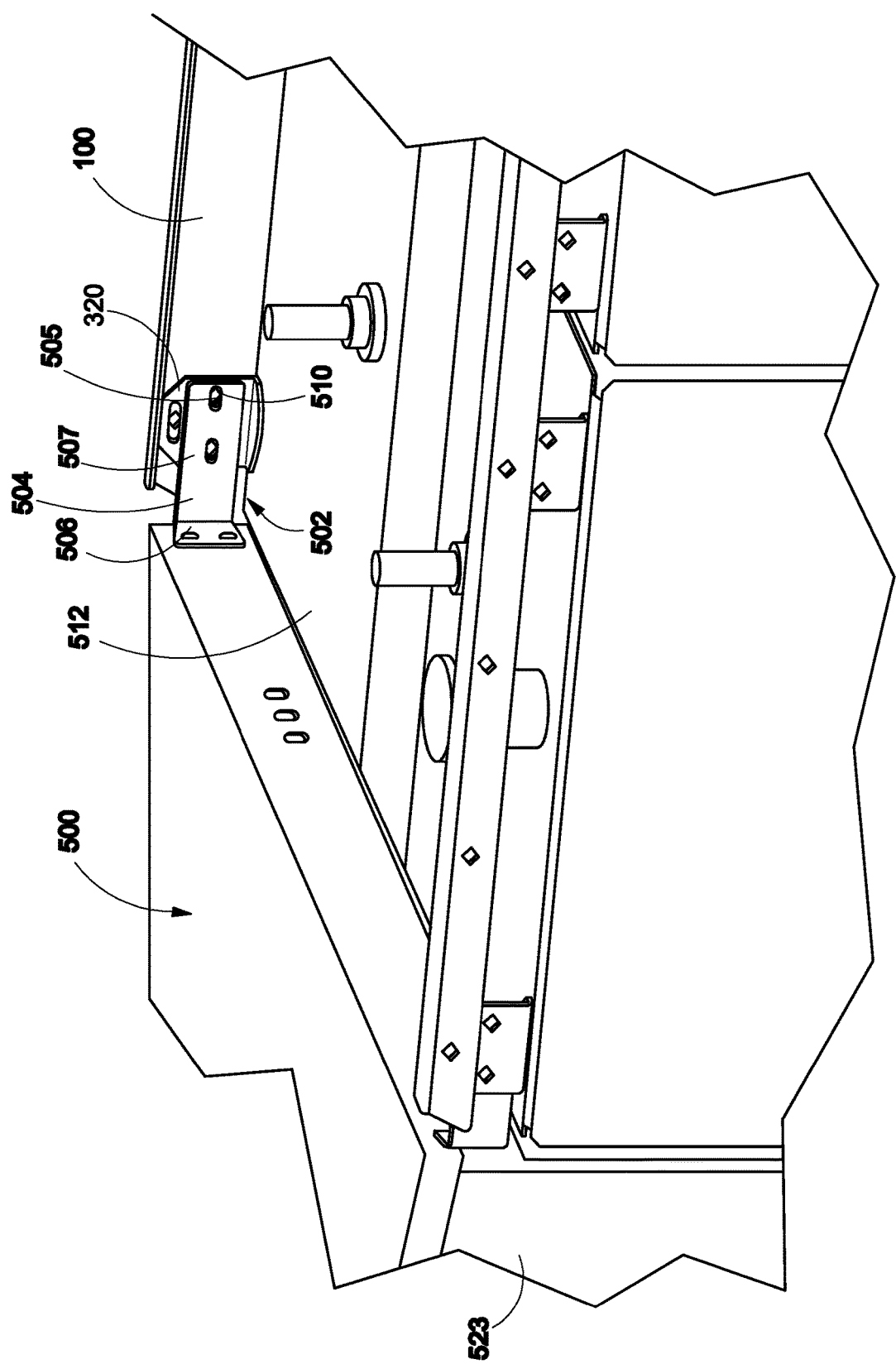
FIG. 15 provides a perspective of a first embodiment of a bracket associating the multi-tank trailer with a utility box.
Figure 16:
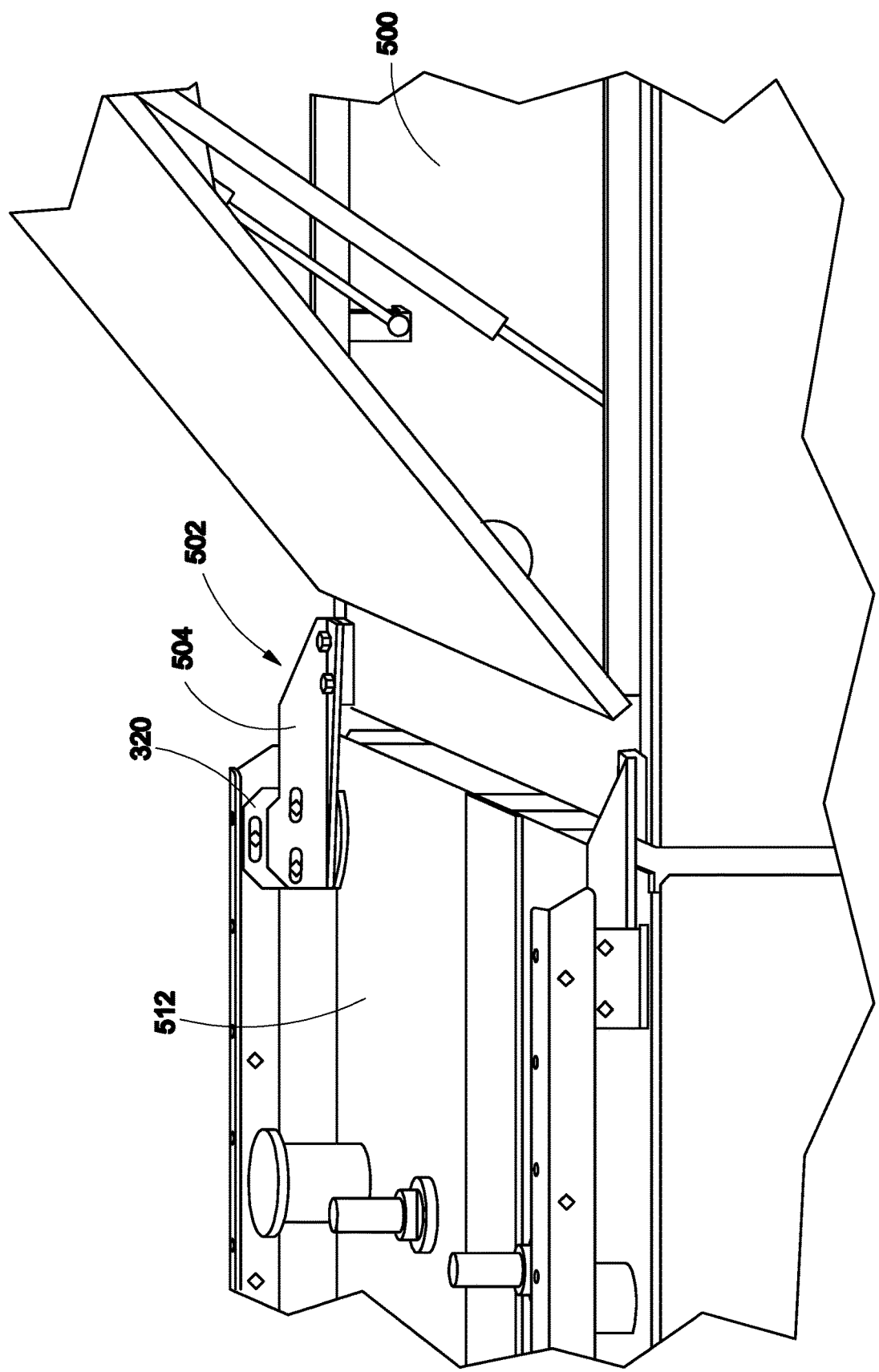
FIG. 16 is a perspective of a second embodiment of a bracket associating the multi-tank trailer with a utility box.
Figure 17:
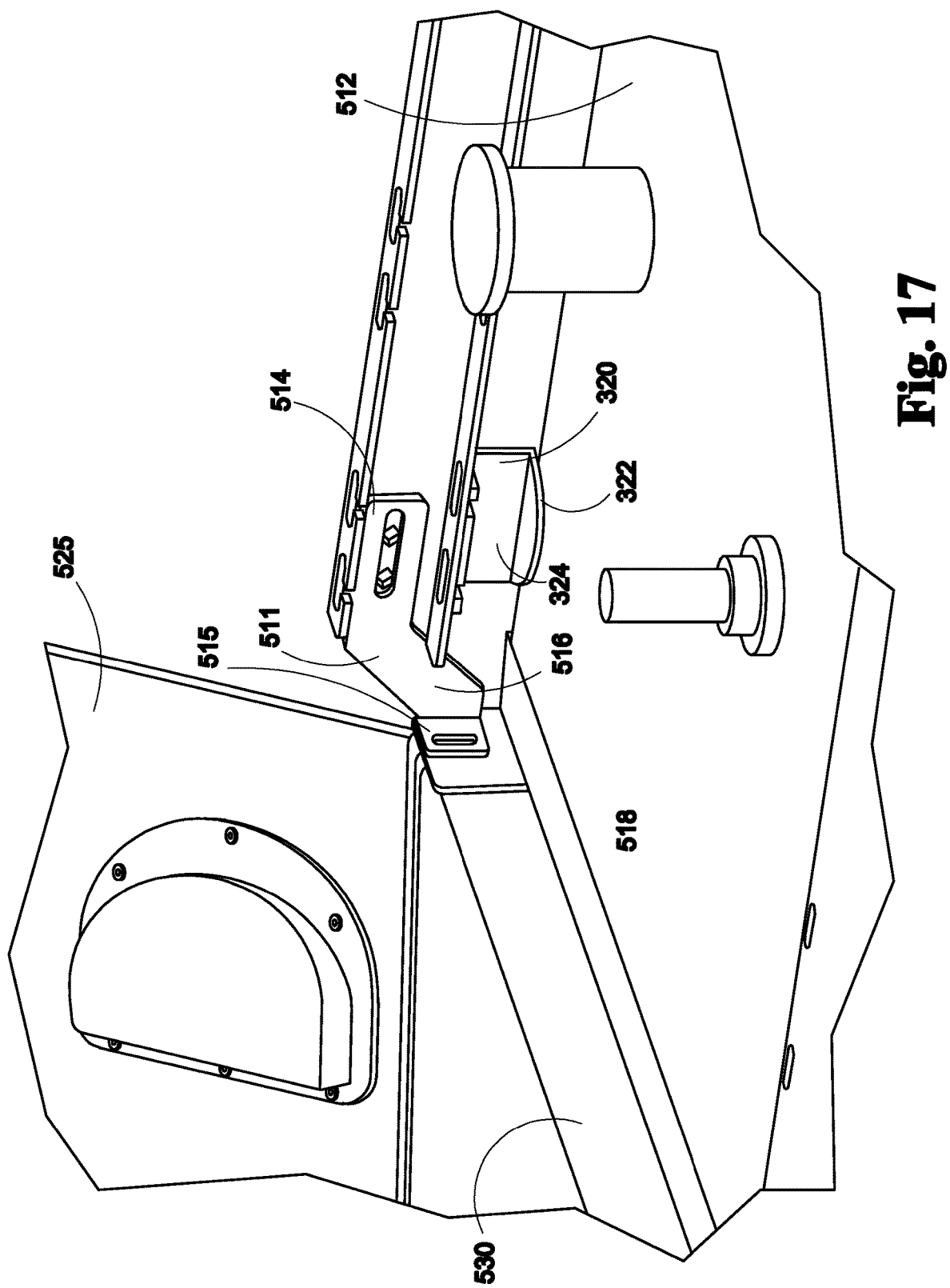
FIG. 17 is a perspective of a third embodiment of a bracket associating the multi-tank trailer with a utility box.
Figure 18:
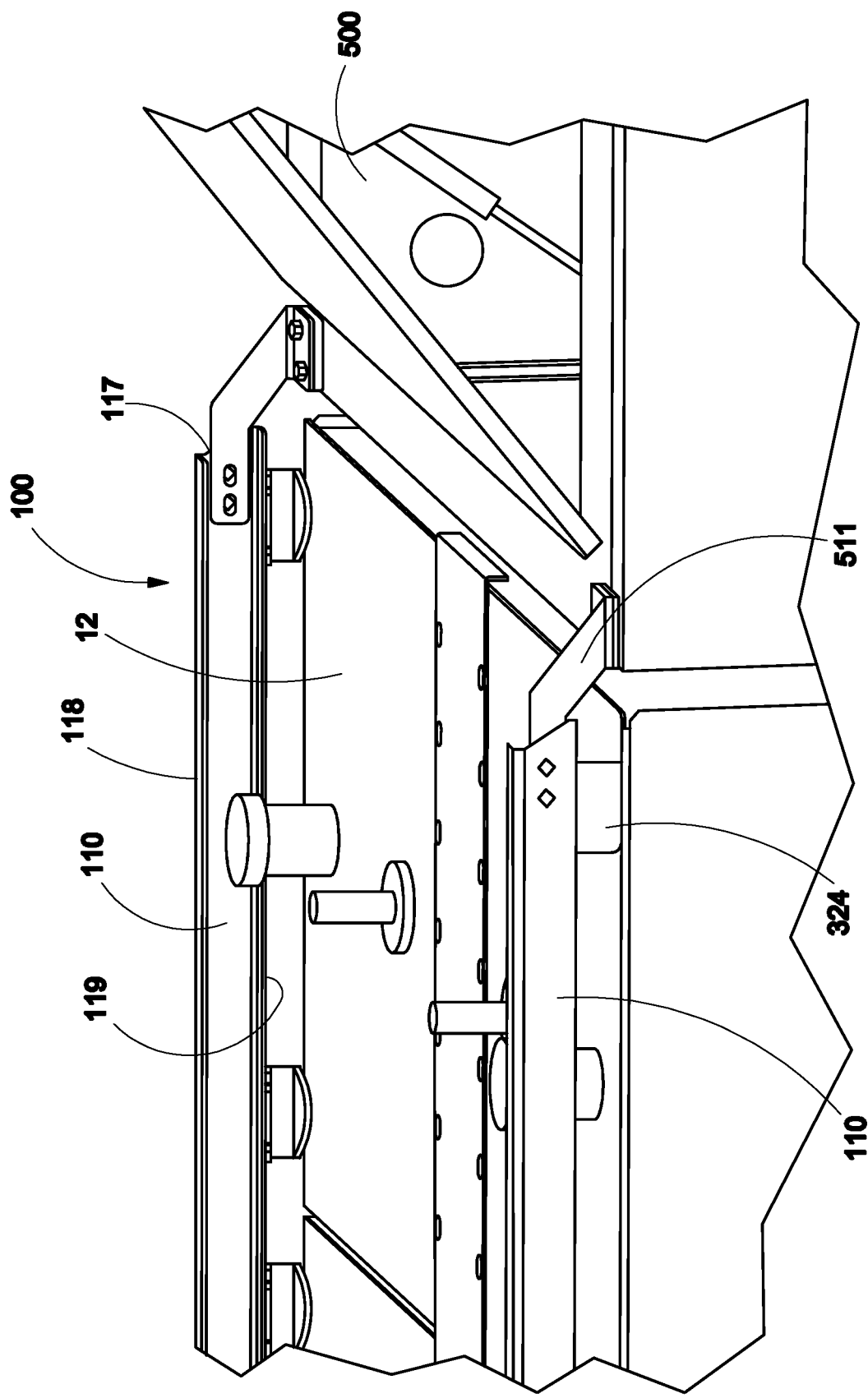
FIG. 18 is a perspective of a fourth embodiment of a bracket associating the multi-tank trailer with a utility box.

In some embodiments, the multi-tank trailer 10 of the present invention includes a utility box 500 (see FIG. 15). The utility box 500 is associated with the handrail assembly 100 by a set of brackets 502 which may comprise a set of straight brackets 504 or a set of angular brackets 511. (see FIG. 17)

The straight brackets 504 comprise a short leg 503 generally perpendicular to a longer leg 507 and may include openings 505 or other elements to facilitate attachment. Means to associate 510 the straight bracket 504 and a top surface 512 of the multi-tank trailer 10 comprise one of the standoffs 320 associated with the handrail assembly 100. The securement means such as screws, bolts, or other detachable attachment means (or permanent securement means such as weldments, glue, adhesive, etc.) 316 secure the bracket 502 to one of the standoffs 320 securing the handrail assembly 100. Said means to associate 510 comprise the stand-offs 320 which are associated with the handrail assembly 100 and the top 512 of the multi-tank trailer 10. The straight bracket 504 is well suited for use with a utility box 500 that comprises a side door 523 to access the box 500, albeit that is not its sole application.

Where an angular bracket 511 is employed to associate utility box 500, the arrangement is similar, however, here the angular bracket 511 is shaped to facilitate use with a handrail assembly 100 that includes a "C" channel rail mounted/secured. The bracket of this embodiment includes two generally co-planar segments 514, 516, angularly offset; the first segment 514 includes means to facilitate attachment to the handrail assembly 100 which may comprise a slot 518 aligned with a slot 520 on the handrail assembly 100 through which securement means 316 are inserted such as nuts/bolts secured therethrough. The second segment 516, angularly offset from, but coplanar with, the first segment 514 may comprise a perpendicular section 515 to facilitate attachment to the toolbox 500. Securement means 316 which may include bolts, pins, locking tabs, etc., are used to secure the perpendicular section 515 to the toolbox 500. In one embodiment, screws or other attachment means known in the art are inserted through an opening 518 in the perpendicular section 515. The angular bracket 511 is especially well suited to use with a utility box 500 that comprises a top access door 525 as it allows the bracket 511 to be associated with a vertical sidewall 530 of the utility box 500, thereby leaving the access door 525 unobstructed for opening.

Finally, these inventive components of the MTT are designed to facilitate a modular design so that the trailer can be "assembled to order" to include the features and capacities desired by the purchaser without the headache and inefficiencies that would be expected for a custom building approach.

CONCLUSION

The present disclosure has described with particularity the novel features of the invention as applied to various embodiments. It will be understood that various omissions and substitutions and changes in the form and details of the invention illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

One skilled in the art will recognize that the herein described components, devices, objects and the discussion accompanying them are used as examples for the sake of conceptual clarity and not for limitation; these examples are intended to be representative of their more general classes. Further, Components associated may be arranged in more than the manner described herein. Associated components may be operably connected or operably coupled to each other to achieve the desired functionality and may be viewed as operably culpable.

Changes and modification may be made without departing from the subject matter described herein and its broader aspects and, therefore, the appended claims are to encompass within their scope all such changes and modifications as are within the true spirit and scope of the subject matter described herein it will be understood by those within the art that, in general, terms used herein, and especially in the appended claims are generally intended as open terms, e.g. "including" should be interpreted as "including but not limited to".

What is claimed is:

1. A multi-tank trailer comprising at least one tank comprising a sloped bottom surface, said trailer further comprising a rail system having at least one rail and a plurality of moveable crossmembers, each said rail of the rail system comprising a sloping angular attachment portion each said sloping angular attachment portion uniformly sized to accommodate the sloped bottom surface of the tank, each sloping angular attachment portion abutting the sloped bottom surface of a tank, each said rail associated with at least one said crossmember, said trailer further comprising a handrail assembly constructed to provide additional structural support for the trailer, each said at least one tank comprising a capacity of no more than 119 gallons, wherein a cumulative capacity of all of the tanks on the trailer is no more than 1,000 gallons.

2. The multi-tank trailer of claim 1 said handrail assembly further comprising a plurality of C-channel rail sections positioned end to end each said C-channel rail section comprising a trapezoidal shape including at least one wedge shaped end, said handrail assembly further comprising a connector assembly having means to associate the at least one wedge shaped end of one of said C-channel rail sections with the wedge shaped end of another one of said C-channel rail sections.

3. The multi-tank trailer of claim 2 wherein the connector assembly comprises an anchor plate and a face plate shaped to fit and fill the space left by the wedge shaped ends of the two rail sections.

4. The multi-tank trailer of claim 1 said handrail assembly comprising a connector assembly, and said rail system comprises at least one axle, at least one pair of wheels, at least one crossmember, and a bracket wherein the at least one crossmember is positioned and secured in the rail system to facilitate attachment of the at least one sloped-bottom tank, said bracket to accommodate the sloped bottom of the tank, said bracket comprising a bend, and a non-sloping portion for association with the at least one crossmember.

5. A multi-tank trailer comprising a rail system, a hand rail assembly, and at least one tank comprising a sloped bottom surface, said sloped bottom surface associated with at least one of a plurality of connectors, each connector of the same dimension and construction and comprising an angular attachment portion to accommodate said sloped bottom surface and to associate the sloped bottom surface of the tank with the trailer, said at least one tank comprising a capacity of no more than 119 gallons wherein each of said at least one tank is associated with the handrail assembly said handrail assembly comprising a plurality of C-channel rail sections arranged generally end to end, and a connector assembly, each said C-channel rail section comprising a first side and a first leg, a second side and a second leg, a first end and a second end, each said end comprising a wedge shape wherein associating a wedge-shaped end of a first rail section with the wedge-shaped end of a second rail section produces a generally "V" shaped space.

6. The multi-tank trailer of claim 5 wherein each of said at least one tank is associated with the handrail assembly said handrail assembly comprising a plurality of C-channel rail sections arranged generally end to end, and a connector assembly, each said C-channel rail section comprising a first side and a first leg, a second side and a second leg, a first end and a second end, each said end comprising a wedge shape wherein associating a wedge-shaped end of a first rail section with the wedge-shaped end of a second rail section produces a generally "V" shaped space.

7. The multi-tank trailer of claim 5, said first leg associated with at least one of the at least one tank.

8. A multi-tank trailer comprising a rail system to associate with a plurality of wheels, a handrail assembly, and at least one tank each said tank comprising a capacity of no more than 119 gallons said handrail assembly comprising a plurality of rail sections wherein at least some of said plurality of rail sections comprise at least one wedge-shaped end, and at least a first of said plurality of rail sections comprising at least one wedge-shaped end is positioned with its wedge-shaped end abutted with a wedge-shaped end of another of said rail sections said handrail assembly further comprising a connector assembly to associate said at least one wedge-shaped end of the first rail section with a wedge-shaped end of said another of said rail sections thereby leaving a triangular space, said connector assembly comprising an anchor plate and a face plate to fill the triangular space left by the wedge shaped ends of the two rail sections.

* * * * *